(12) United States Patent
Minuth et al.

(10) Patent No.: US 6,396,282 B1
(45) Date of Patent: May 28, 2002

(54) PROCESS FOR TESTING THE GROUND CONTACT OF PARTS OF A NETWORKED SYSTEM

(75) Inventors: Juergen Minuth, Eislingen; Juergen Setzer, Illingen; Guenther Schwarz, Kirchheim; Max Reeb, Boertlingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/155,396

(22) PCT Filed: Mar. 26, 1997

(86) PCT No.: PCT/EP97/01534
§ 371 (c)(1),
(2), (4) Date: Apr. 19, 1999

(87) PCT Pub. No.: WO97/36184
PCT Pub. Date: Oct. 2, 1997

(30) Foreign Application Priority Data

Mar. 26, 1996  (DE) .......................................... 196 11 944

(51) Int. Cl.⁷ ............................................. G01R 31/14
(52) U.S. Cl. .................. 324/509; 324/421; 361/88; 361/85
(58) Field of Search ................. 324/509, 693, 324/507, 415, 418, 421, 535, 71.1; 340/941, 917; 371/68; 361/88, 85

(56) References Cited

U.S. PATENT DOCUMENTS 3,651,452 A  *  3/1972  Friedman
3,790,779 A  *  2/1974  Paddison
3,795,285 A  *  3/1974  Scholl
4,353,341 A  * 10/1982  Henning
4,796,151 A  *  1/1989  Asada
5,175,764 A  * 12/1992  Patel
5,200,688 A  *  4/1993  Patino
5,659,608 A  *  8/1997  Stiefel
5,734,658 A  *  3/1998  Rall
5,924,041 A  *  7/1999  Alperovich

FOREIGN PATENT DOCUMENTS

| DE | 38 26 774 A1 | 2/1990 |
| EP | 0 474 907 A1 | 3/1992 |
| EP | 0 614 298 A2 | 9/1994 |
| JP | 54-79688 | 6/1979 |
| JP | 6-153301 | 5/1994 |
| JP | 6-153303 | 5/1994 |

* cited by examiner

Primary Examiner—Michael J. Sherry
Assistant Examiner—Trung Q. Nguyen
(74) Attorney, Agent, or Firm—Crowell & Moring LLP

(57) ABSTRACT

In a method for testing the ground contact of parts of a networked system in which data are sent and received via at least one line, at least one line at each part is connected via a resistance arrangement to a common potential of the parts and is connectable via a controllable switch to a further potential. The voltage across the resistance arrangement is compared with a predetermined potential when the line is at one potential in a steady state, and the state of the ground contact of the part is deduced from a comparison of the voltage across the resistance arrangement with the predetermined potential.

24 Claims, 7 Drawing Sheets

PROCESS FOR TESTING THE GROUND CONTACT OF PARTS OF A NETWORKED SYSTEM

BACKGROUND AND SUMMARY OF THE INVENTION

The present invention relates to a method and apparatus for testing the ground contact of parts of a networked system.

By way of example, it is known in the field of motor vehicles for a plurality of controllers to be networked in order to allow data to be interchanged between the individual controllers. Owing to the fact that a data protocol is produced, which is sent via one or more lines between the controllers and in which the corresponding data can be entered and read at the appropriate points, it is possible to save a considerable amount of complexity and material in the wiring. Without a data bus a separate cable would be required for each item of information to be interchanged between the respective controllers.

Data are written to and read from the protocol of this data bus by applying a specific voltage level to the line or lines for a specific time period. To do this, it is necessary for these controllers to have a virtually identical reference-ground potential. In the case of a motor vehicle, this is the vehicle ground, with which all the electrical equipment in a motor vehicle makes contact, as an equipotential surface. Networked systems of the type described have become known, for example, as CAN systems.

European patent document EP 0 614 298 A2 discloses a circuit arrangement which is intended to prevent total failure of the entire network if a breakdown in the ground connection or a short to the supply potential occurs on one of the parts in the networked system.

Furthermore, European patent document EP 0 474 907 A1 discloses a method for error identification in a networked system, in which the parts of the networked system are connected to one another in the form of a ring. A wire break at one point in the networked system can be identified in the case of this method by the data originating from one subscriber being sent in both directions. If a receiver receives the data from only one direction, then it is possible to deduce that a wire break is present between the two parts on the path which corresponds to the other direction.

If the ground contact of individual controllers now deteriorates relative to other controllers, disturbances in data transmission can occur since the voltage levels of the individual parts of the networked system are shifted with respect to one another. If the shift is so severe that it is greater than the system tolerance, then there is no longer any certainty that changes in the voltage levels on the data bus can be identified.

One object of the present invention is therefore to identify as early as possible, a deterioration in the ground contact of individual subscribers on a networked system in which data are sent and received via at least one line, with at least one line at each part of the networked system being connected via a resistance arrangement as well as a contact to a common potential of the parts and being connectable via a controllable switch to a further potential.

According to the invention in order to test the ground contact of parts of the networked system, the voltage across the resistance arrangement is compared with a predetermined potential when the line is at one potential in a steady state, and the state of the ground contact of the part is deduced from a comparison of the voltage across the resistance arrangement with the predetermined potential. In this manner, a faulty ground contact can be identified at an early stage, simply and without adversely affecting the ongoing transmission of data. In the case of a CAN network, it is possible to confirm a test of the ground contact by means of the CAN_H line.

According to the invention a method is carried out in which the voltage across the resistance arrangement is compared with a predetermined potential when the line is at one potential in a steady state, the state of the ground contact of the part being deduced from a comparison of the voltage across the resistance arrangement with the predetermined potential.

A faulty ground contact can also advantageously be identified at an early stage in this way using simple means, without adversely affecting the ongoing transmission of data. In the case of CAN network, it is possible to confirm a test of the ground contact by means of the CAN_L line.

In the case of both subjects, a local shift in the voltage owing to a faulty ground contact is compared with the potential on the respective data line. An "average" potential is present on all parts via the connection on the data lines—via the connection at each controller, that is to say each part of the networked system. Any ground fault in an individual subscriber thus has only a minor influence on the potential on the data line. As a consequence of this, in the event of an ground fault in an individual subscriber, a voltage difference is produced across the resistance arrangement, and this voltage difference can be evaluated.

Whenever the controllable switches change over, the potential on the data lines changes at the same time. When such a potential change takes place, overshoots occur which can corrupt the result of any evaluation of the voltage across the resistance arrangement. For this reason, no comparison should take place until the potential on the data line is in a steady state.

Accordingly, in one embodiment of the method according to the invention, the potential in the steady state is the common potential. Such a comparison allows ground faults to be detected directly. The comparison when the ground potential on the CAN_H line is in the steady state indicates, advantageously as against a comparison when a VCC potential on the CAN_L line is in the steady state, that more or less undefined voltage losses resulting from the quality of components which are still being used are irrelevant.

In another embodiment of the method according to the invention, the potential in the steady state corresponds to the part-specific potential. In this case as well, undefined voltage losses resulting from the quality of components which are still being used are irrelevant.

In still another embodiment of the method according to the invention, the comparison is carried out with a certain time lag, after which the line is connected, by means of the controllable switches, to a specific potential. The time lag in this case must on the one hand be of such a duration that the steady state is reached, and on the other hand must be of such a duration that the potential has not already switched back again.

In still another embodiment the comparison is carried out within a time window after the switching state of the controllable switches has changed. In this case the time delay which the components experience until the switching process actually takes place is used advantageously. When the state of the transceiver changes, a time period on the order of magnitude of 500 ns passes before the switching process has taken place. The comparison is carried out within this time window, which advantageously ensures that the potential is in a steady state and that the correct potential is present. Thus, the comparison is carried out within the time window while the transceiver is in the "recessive" state.

According to another feature of the invention, the battery voltage which can be detected by the individual subscriber is compared with the battery voltage which can be detected by one or more reference subscribers, and a faulty ground contact is deduced if the discrepancy in the detected battery voltages is above a specific threshold value. This method is suitable for detecting a possibly faulty ground contact independently of the check already described. The locally detected battery voltage is sent, for example as information via the bus, to a further controller which, as a reference, itself determines the battery voltage which can be detected there. If the transmitted value of the battery voltage is lower or higher, a ground fault can be deduced.

It should be noted that a reduction in the locally detected battery voltage can also be caused by a faulty contact to the +−connection. For this reason, a further feature of the invention is particularly suitable in combination with the already described methods for verification of the results obtained. In this case as well, the locally detected battery voltage is sent, for example as information via the bus, to a further controller which, as a reference, itself determines the battery voltage which can be detected there. If the transmitted value of the battery voltage is lower or higher, a ground fault can be deduced.

According to another feature of the invention, the contacts of the reference subscriber are designed to be duplicated in order to improve the contact. In this way, a fault source in which a faulty ground contact of the part intended to be used as a reference leads to incorrect results, can be minimized.

In another embodiment of the invention, the comparison of the battery voltage in a motor vehicle is carried out only above a specific rotation speed value. This advantageously avoids incorrect assessments being made as a result of the vehicle's power supply voltage (and thus the measurable battery voltage) being too low owing to the low rotation speed.

In still another embodiment of the invention, the comparison is activated when a specific minimum load current is flowing in the appropriate part, so that any faulty ground contact also produces a corresponding potential shift.

In yet another embodiment, an entry is made in a diagnostic memory when a discrepancy is identified which exceeds the threshold value relating to the respective subscriber. This allows any faults that have been identified to be read out, for example during routine servicing. The identified faults can be indicated, for fault rectification.

In yet another embodiment, the single-wire reception thresholds are shifted in an appropriate manner when a discrepancy above the threshold value relating to the respective subscriber is identified. Thus, communication is still possible even if individual subscribers have a faulty ground contact.

According to another feature of the invention, when a discrepancy above the threshold value is identified by the respective subscriber, data are transmitted only when the controller is free of load current, thereby avoiding excessive shifts of the voltage level when sending data, caused by the faulty ground contact. Specifically, if a load current is present, the potential shift caused by the faulty ground contact is particularly pronounced.

According to another feature of the invention, a multiple detection—interrogation of the ground offset—is carried out, so that dynamic disturbances or superimposed voltages cannot lead to misinterpretation. Thus, for example, ground shifts caused by dynamic events, resulting, for example, from the stalling current of a positioning motor, can be filtered out.

In a further embodiment according to the invention of an apparatus for testing the ground contact of parts in a networked system, the network is implemented by sending and receiving data via two lines. One line at each part is connected via a resistance arrangement and a contact to a common potential for the parts and is connectable via a controllable switch to a further potential. The other line at each part is connected via a resistance arrangement to a part-specific potential of the parts and is connectable via a controllable switch and a contact to a common potential. The voltage drop across at least one resistance arrangement is supplied to one input of a comparator whose other input is supplied with a comparison potential, and the state of the earth contact of the part is deduced from the output signal of the comparator.

This results in a circuit design which can be illustrated comparatively easily and can also be produced cost-effectively in integrated form.

Finally, according to another feature of the invention, the various potentials which are supplied to the inputs of the comparators are generated from a voltage and are supplied to the respective inputs of the comparators via a multiplexer. In this manner, the circuit can be produced with a low level of hardware complexity. The voltages to be measured can also be supplied to an evaluation unit via a multiplexer.

Other objects, advantages and novel features of the present invention will become apparent from the following detailed description of the invention when considered in conjunction with the accompanying drawings.

DETAILED DESCRIPTION OF THE DRAWINGS

Figure 1:
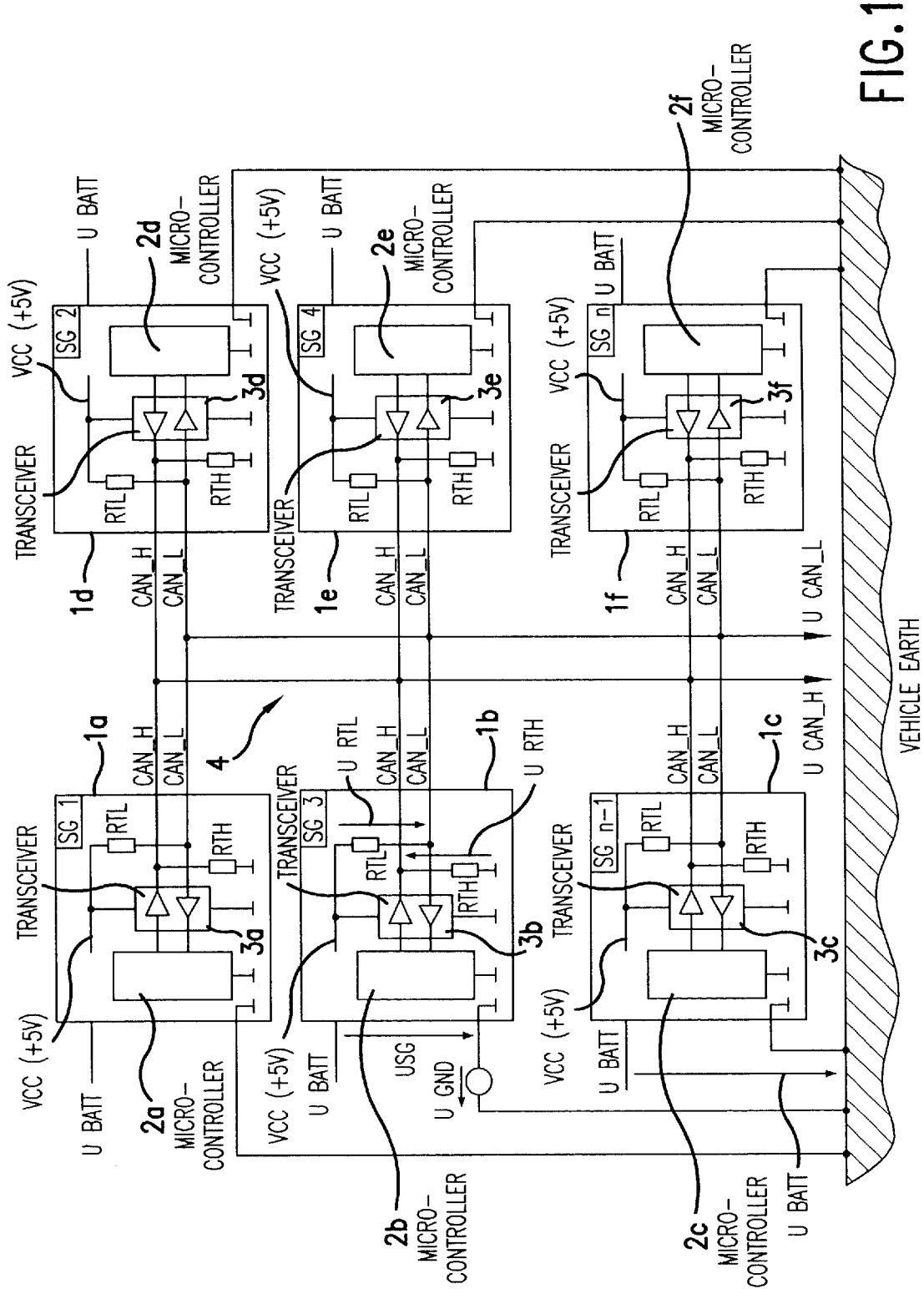
FIG. 1 illustrates a plurality of network subscribers connected by a CAN bus.

FIG. 1 illustrates a plurality of network subscribers 1a–1f. The subscribers are in this case formed by controllers, which have a microcontroller 2a–2f. The subscribers are coupled to the network by means of transceivers which may advantageously be designed as integrated circuits. Subscribers networked in such a manner may be, for example, a plurality of controllers in a motor vehicle which have to interchange data with one another.

FIG. 1 illustrates communication via a data bus 4 which is composed of two lines (CAN_H and CAN_L). Owing to this system configuration, ground faults of individual subscribers which produce a potential shift of up to 4 volts are tolerated.

If, for example, due to a short-circuit to ground from one of these lines, communication remains possible via only one line, to only potential differences—likewise system-specific—of up to 1.25 volts can be tolerated. It is thus possible for individual subscribers which were previously operating without any problems during communication via two lines suddenly no longer to be able to take part in the communication. It is thus desirable to identify such ground faults as early as possible.

As can be seen from FIG. 1, CAN_H is connected via specific termination resistances in each subscriber to the ground contacts that are present there. CAN_L is connected via specific termination resistances in each subscriber to the VCC voltage (+5 V) which is present there.

This means that the voltage on CAN_H and CAN_L represents an averaged value of the respective ground contacts and VCC voltages of the individual subscribers. Any discrepancies in these voltages between individual subscribers have only a minor influence on the voltage on the data line. Thus, in the event of a local discrepancy in the potential resulting from a faulty ground contact on CAN_H or CAN_L, measurable voltages occur, which differ from the expected values.

Furthermore, the local supply voltage to the subscribers (U SG) can be measured by the individual subscriber itself, in this case against its own ground connection. If the ground connection is faulty, the supply voltage which can be measured by the individual subscriber is thus correspondingly lower. This supply voltage value can be transmitted via the data bus and compared with other detected supply voltages. Any discrepancy allows a faulty contact to be deduced, in which case the contact and/or the UBATT contact can be faulty.

It has been found that it is possible by observing these relationships to deduce a ground offset of individual subscribers.

Figure 2:
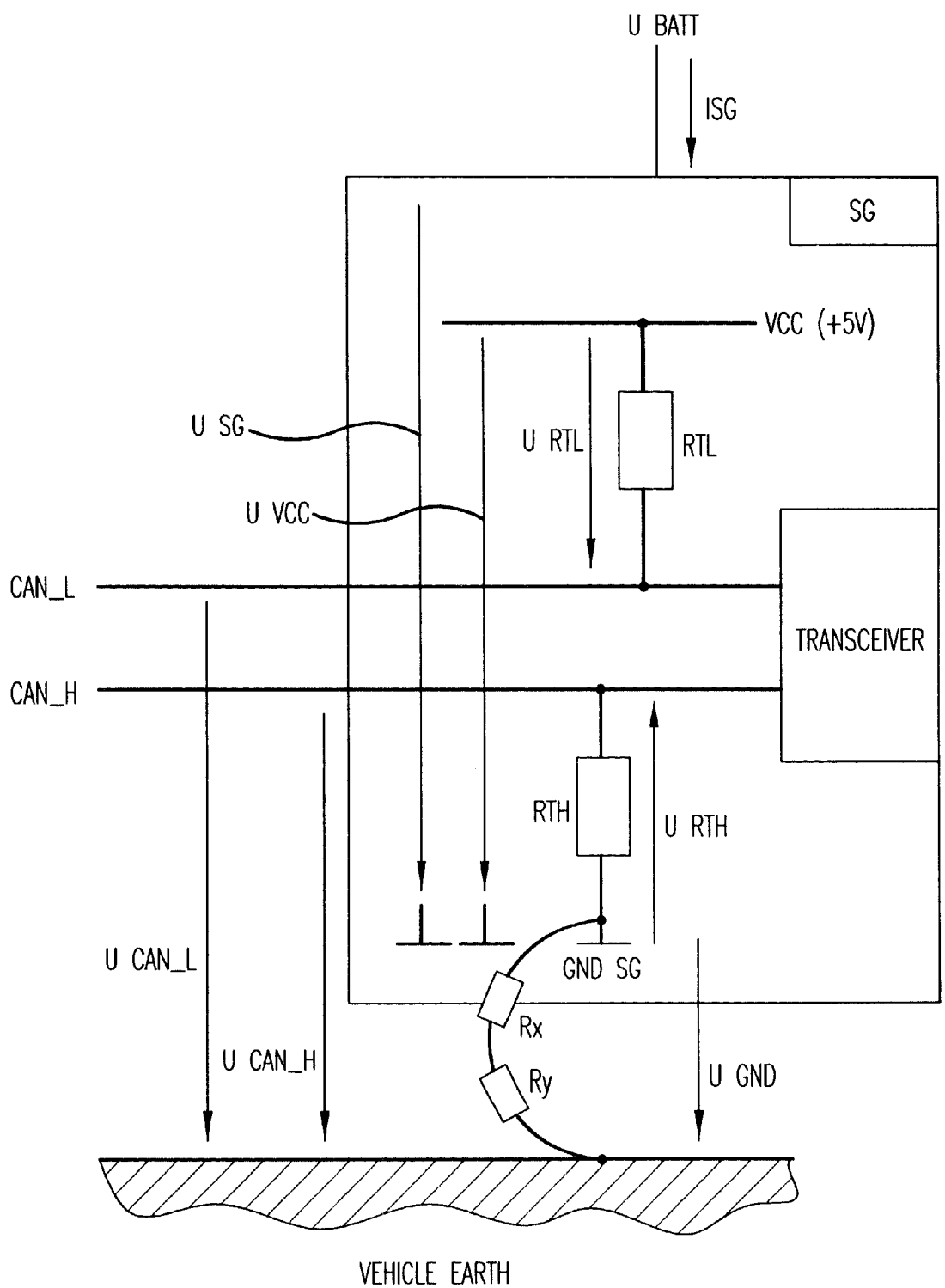
FIG. 2 illustrates the voltage conditions of a subscriber which has a ground fault.

This is shown in FIG. 2, which illustrates the voltage relationships of the subscriber where there is a ground offset. This subscriber ground offset (that is to say a potential shift between GND SG and the vehicle ground) can be caused by a poor ground contact at the controller (Rx) and/or the bodywork ground (Ry). The applicable equations are then as follows:

*U SG=U BATT−U GND*

*U GND=I SG\* (Rx+Ry)*

*U RTL=U VCC−U CAN_L*

*U RTH=U GND−U CAN_H*

If no ground fault is present, then this results in:

*GND SG=CAN_H=vehicle earth*

*VCC=CAN_L*

*U SG=U BATT*

This results in U RTH=0 volts and U RTL=0 volts.

The relevant tolerances (RTH, RTL, VCC etc.) must still be observed in these relationships.

Observing all the tolerances, the following limits can be defined—based on the requirement that communication is still functional even in the case of single-wire data transmission (see the maximum permissible potential discrepancies quoted above):

*URTH<1 Volt*

*U RTL<1 Volt*

*U SG>(U BATT−2 volts)*

In this case, the determination of the local ground fault is carried out in the bus-idle mode or in the recessive bus state. In doing so, it must be remembered that the maximum controller operating current I SGmax is flowing, since the maximum potential shift occurs owing to an ground fault:

*U GND=I SG\* (Rx+Ry)*

The measurement of the ground error is thus expediently coupled to the controller-specific application (For example when the window winder motor is active).

If voltage differences of, for example, more than 800 mV are found on RTH or RTL, the voltage U SG can also be considered (for verification).

When a ground fault has been identified, there are various sensible measures that can be taken. For example, the receiver single-wire reception thresholds can be manipulated, the identified fault can be written to a diagnostic memory which, for example, can be read out during routine servicing of the vehicle, or communication (transmission) can be carried out only when the controller is free of any load current (emergency mode). Specifically, in this case, there is no potential shift, or only a small potential shift.

Figure 3:
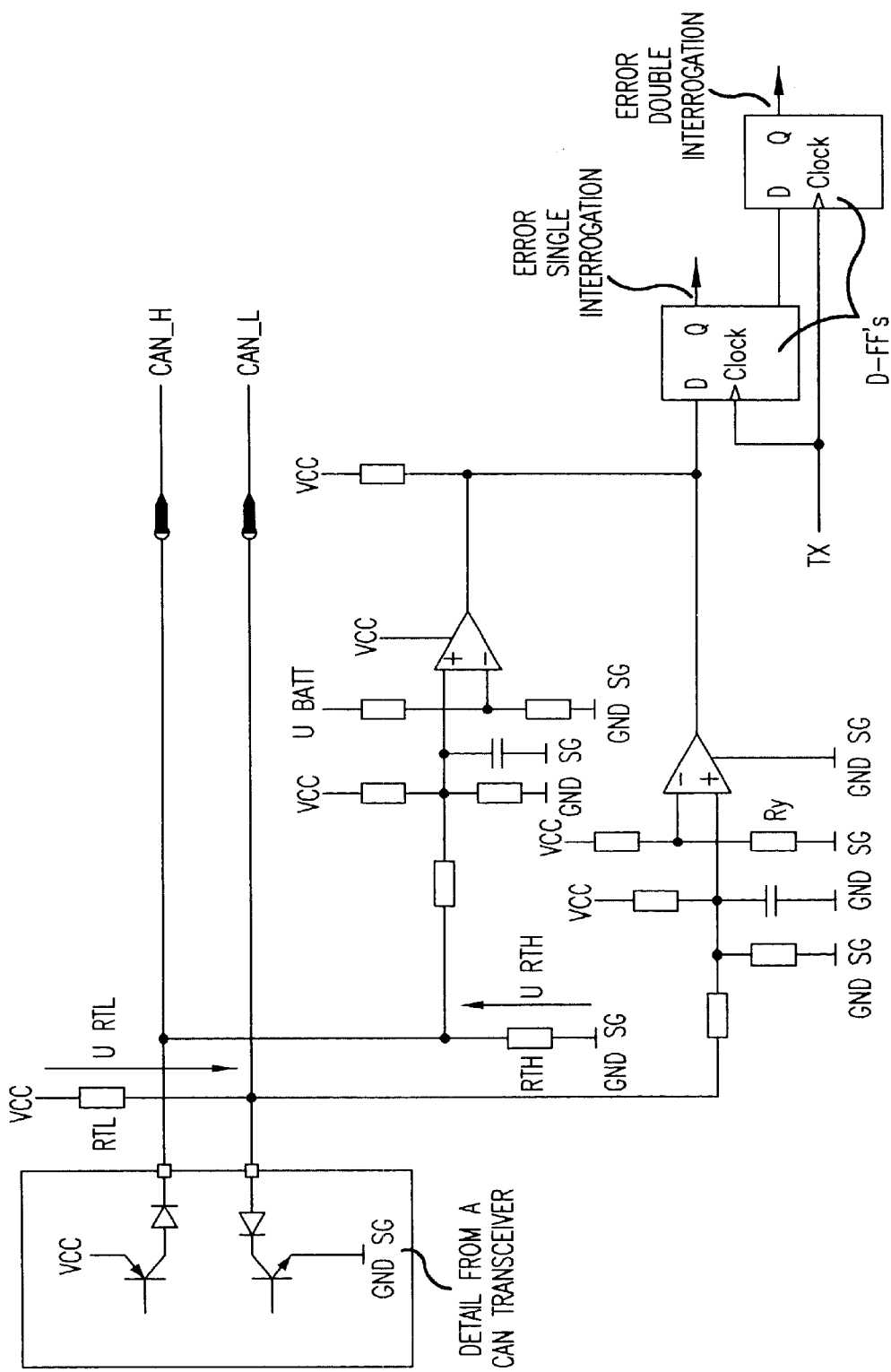
FIG. 3 shows a first exemplary embodiment of a circuit for identifying a ground fault of a subscriber.

FIG. 3 shows a first representative embodiment of a circuit for identifying a ground fault. In this case, the voltages U RTH and U RTL are each supplied to one input of respective comparators. The other input of each comparator is in this case supplied with a voltage which is derived from the voltage VCC with respect to the ground potential (GND–SG). The measurement is carried out via a trigger module once the bus is in the steady recessive-state. This can be done after a period of time has elapsed since the transition to the recessive state. This time period must be chosen such that the transient process has passed, and it is also necessary to ensure that the system has not yet switched back to the dominant state.

The ground offset measurement can be verified x-times by downstream flipflops, before an ERROR activation takes place.

Figure 4:
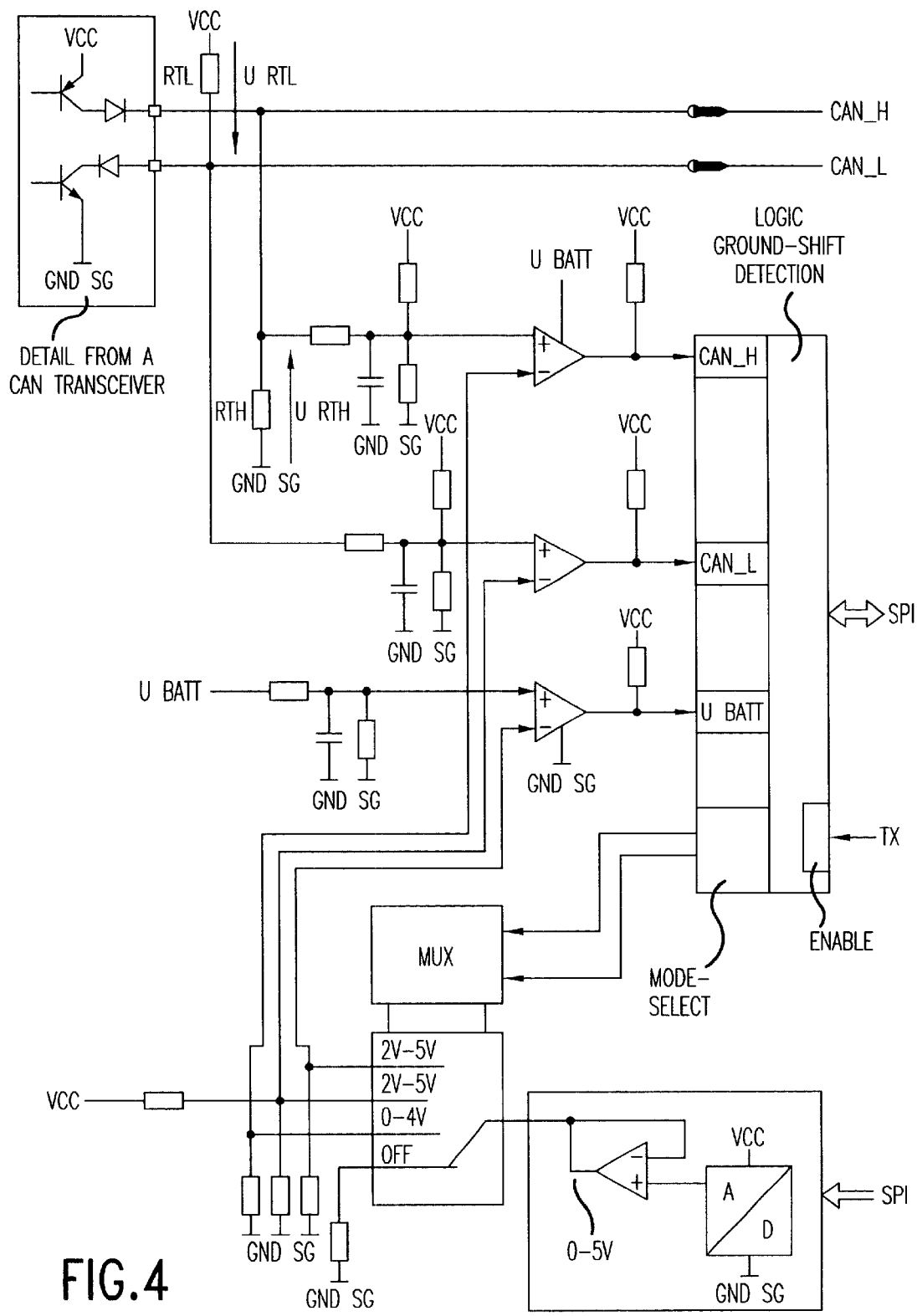
FIG. 4 shows a further exemplary embodiment of a circuit for identifying a ground fault of a subscriber.

FIG. 4 shows a further embodiment of a circuit for identifying a ground fault in which, in comparison with the circuit according to FIG. 3, the battery voltage U BATT is also considered. Furthermore, the reference-ground potentials are generated and supplied to the respective inputs of the comparators via a multiplexer, by means of a single D/A converter.

Figure 5:
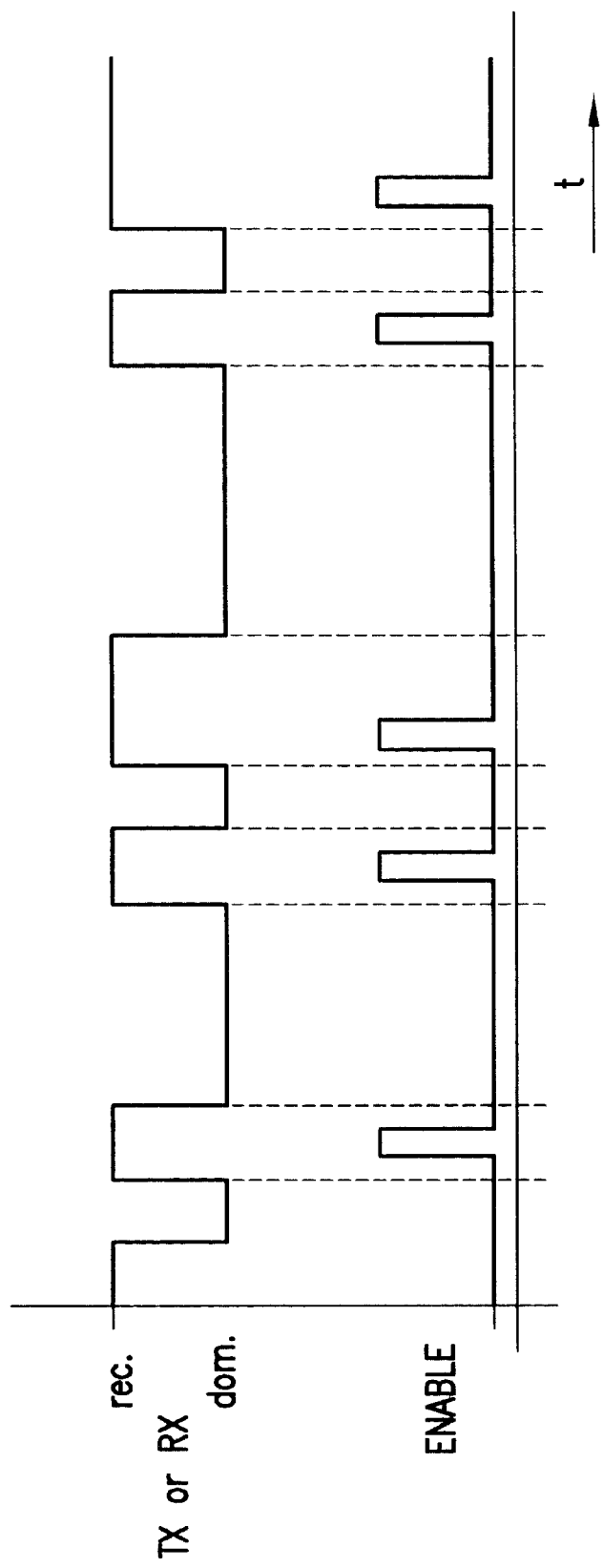
FIG. 5 illustrates the timings for defining the time at which a ground fault is measured.

FIG. 5 illustrates the timings for defining the time when the ground fault measurement is carried out. The upper part of this illustration shows the state of the bus (recessive or dominant). The lower part of the illustration shows when a measurement is intended to be carried out, as a function of the bus state (Enable).

Figure 6:
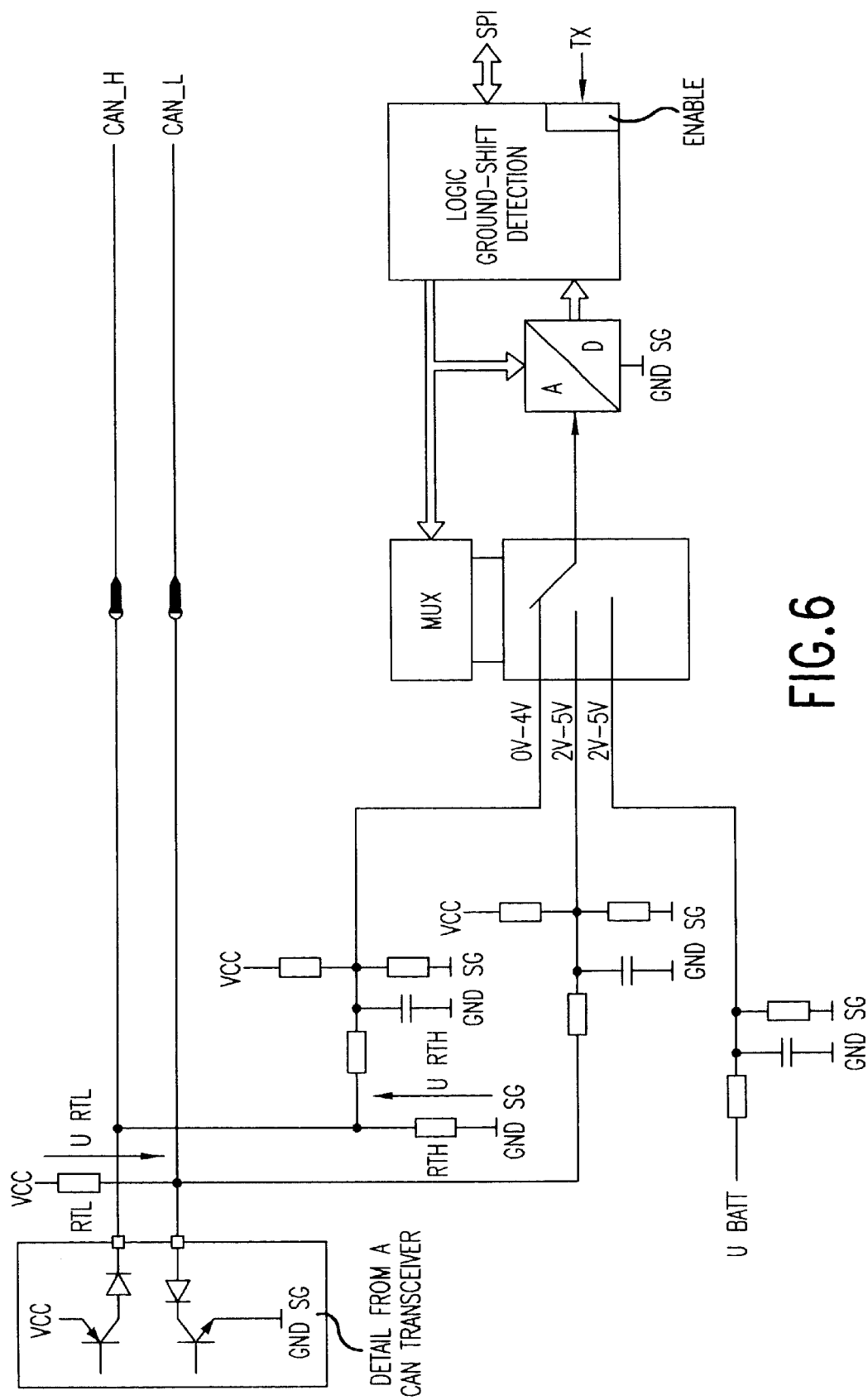
FIG. 6 shows a further exemplary embodiment of a circuit for identifying a ground fault of a subscriber.

FIG. 6 shows a further embodiment of a circuit for identifying a ground fault, which is particularly suitable for integration in a system basic chip. In this case, the variables U RTH, U RTL, U BATT to be measured are supplied via a multiplexer to a single A/D converter, via which the voltages to be evaluated are supplied to a logic module. This module is furthermore supplied with a signal which represents the bus state, so that the measurement and evaluation are carried out at the correct time.

This makes it possible for the measurement to be carried out in a simple manner, with a low level of hardware complexity.

Another method for defining the time of the measurement will be explained with reference to FIG. 7.

The Diagram 7a shows the voltage U CAN_H when changes take place from the recessive state to the dominant state and from the dominant state to the recessive state. As can be seen from the illustration in FIG. 7a, the time profile of the voltage U CAN H shows that the signal has an overshooting response when a TX change takes place (see FIG. 7b) from "1" to "0" and vice versa. When a change from "dominant" to recessive takes place, the voltage U CAN_H is less than the voltage U GND. As can also be seen from the diagram in FIG. 7a, the voltage U CAN_H changes only with a certain time delay after a change of TX. This time delay is on the order of magnitude of about 500 ns. As can be seen from the illustration of the timing of the comparator as output in the diagram in FIG. 7c, the output of the comparator changes from "1" to "0" during the TX transition, owing to the overshooting response. However, this has nothing to do with a poor ground contact. Therefore, this change in the comparator output should not be regarded as a fault.

As can be seen from the illustration in FIG. 7, the measurement and the comparison of the voltages take place at the time t1, which is within a time window after the TX change from "1" to "0". At this time, the voltage on the CAN_H line has not yet changed. This furthermore ensures that the recessive state is in the steady state at this time (immediately before the transition to the dominant state).

The measurement and comparison of the voltages are thus advantageously carried out at this time t1. This also ensures that changes in the comparator output which occur, for example, as a result of the overshooting response of the voltage on the CAN_H line do not lead to misinterpretations.

Figure 7A:
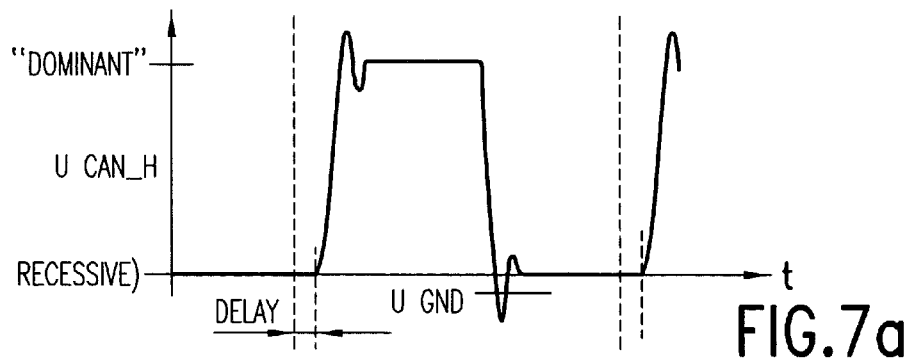
FIG. 7 shows the time relationships of TxD and the bus level of CAN_H.
Figure 7B:
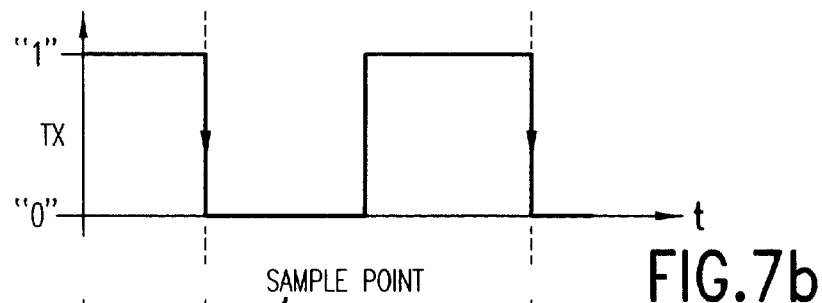
Figure 7C:
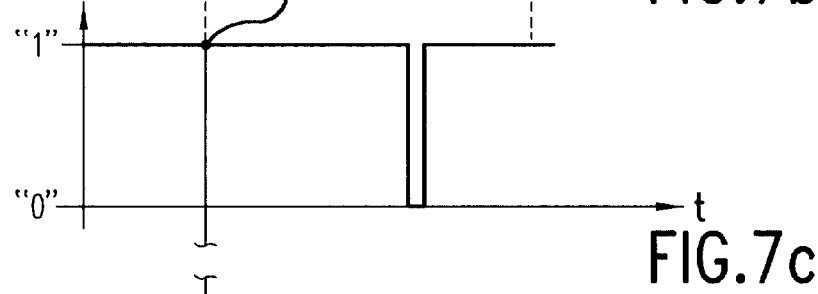
Figure 7D:
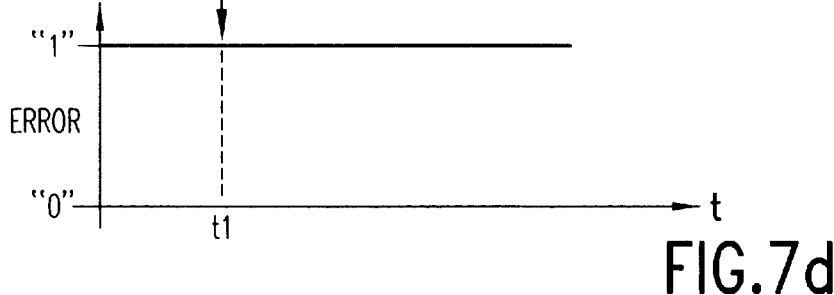

FIG. 7d shows the logic variable which may represent a ground fault. This variable is updated at the time t1. Since the fault was not present at this time, no fault is identified.

The relationships will be explained with reference only to the CAN_H line in conjunction with FIG. 7. Since the relationships on the CAN_L line lead only to a redundant result, it is sufficient to carry out a measurement and a comparison on the basis of only one of these two lines. The use of the CAN_H line for this purpose has the advantage that the ground potential is present directly there, in the recessive state.

Figure 8:
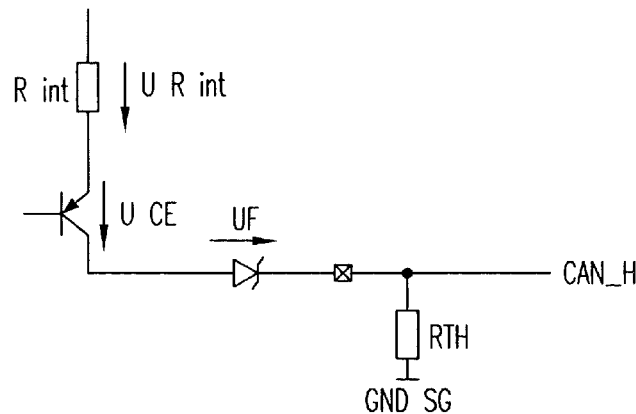
FIG. 8 shows the voltage losses of a typical CAN_H driver stage within the transceiver.

The measurement in the recessive bus state in comparison with the dominant bus state furthermore has the advantage that the voltage level of the data bus is largely independent of the quality of any components. By way of example, FIG. 8 uses the CAN_H line to show the voltage relationships in the dominant state. The voltage CAN_H line is in this case governed by VCC, in which case it is necessary to take into account the following voltages:

U Rint: voltage drop across a resistor
U CE: voltage from the collector to the emitter of the switching transistor
U F: forward voltage of a Schottky diode.

Owing to the predetermined tolerances, the sum of these voltages may be up to 1.4 volts. Since neither the quality nor the tolerances of the components are defined precisely, this can lead to discrepancies in the voltages. These voltage discrepancies would be reflected in any measurement in the dominant bus state. On the other hand, if the measurement is carried out in the recessive bus state, the transistor is switched off, so that the tolerances of the components are no longer relevant.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for testing ground contact of respective members of a networked system comprising a plurality of members which are coupled in data communication by transmission of data among said members via at least one line which at each member is connected via a resistance to a common potential of the members, said at least one line also being connectable via a controllable switch to a further potential for transmitting data among said members via said at least one line, said method comprising:

comparing a voltage across the resistance with a predetermined potential when the line is at one potential in a steady state; and determining existence or absence of a faulty ground contact of a member based on a result of said comparison.

2. The method according to claim 1, wherein the potential in the steady state is the common potential.

3. The method according to claim 1, wherein the comparison is carried out with a time lag, after which the line is connected to a specific potential via the controllable switches.

4. The method according to claim 1, wherein the comparison is carried out within a time window after a switching stage of the controllable switches has changed.

5. The method according to claim 1, wherein a local battery voltage which can be detected by each individual member is compared with a battery voltage which can be detected by at least one reference member, and a faulty ground contact is deduced if any variation in detected battery voltages exceeds a specific threshold value.

6. The method according to claim 5, wherein contacts of the reference subscriber are designed to be redundant.

7. The method according to claim 5, wherein in a motor vehicle, the comparison of the battery voltage is carried out only above a specific rotation speed value.

8. The method according to claim 1, wherein a comparison is activated in a particular member when a specific minimum load current is flowing in the particular member.

9. The method according to claim 1, wherein an entry is made in a diagnostic memory when a discrepancy greater than a threshold value relating to a respective member is identified.

10. The method according to claim 1, wherein single-wire reception thresholds are shifted when a discrepancy greater than a threshold value relating to a respective member is identified.

11. The method according to claim 1, wherein when a discrepancy greater than a threshold value is identified by a respective member data are transmitted only when the controller is free of load current.

12. The method according to claim 1, wherein a multiple ground offset error interrogation is carried out before an error indication is produced.

13. A method for testing ground contact of respective members of a networked system comprising a plurality of members which are coupled in data communication by transmission of data among said members via at least one line which at each member is connected via a resistance to a member-specific potential, said at least one line also being connectable via a controllable switch and a contact to a common potential for transmitting data among said members via said at least one line, said method comprising:

comparing a voltage across the resistance with a predetermined potential when the line is at one potential in a steady state; and determining existence or absence of a faulty ground contact of a member based on a result of said comparison.

14. The method according to claim 13, wherein the potential in the steady state corresponds to the member-specific potential.

15. The method according to claim 13, wherein the comparison is carried out with a time lag, after which the line is connected to a specific potential via the controllable switches.

16. The method according to claim 13, wherein the comparison is carried out within a time window after a switching stage of the controllable switches has changed.

17. The method according to claim 13, wherein a local battery voltage which can be detected by each individual member is compared with a battery voltage which can be detected by at least one reference member, and a faulty ground contact is deduced if any variation in detected battery voltages exceeds a specific threshold value.

18. A method for testing ground contact of subscribers of a networked system, having a plurality of subscribers, including reference subscribers, which are coupled to a battery, said method comprising:

detecting local battery voltage at each subscriber;

transmitting detected local battery voltages to at least one reference subscriber via the networked system;

comparing said local battery voltages with battery voltage detected by the at least one reference subscriber; and deducing existence of a faulty ground contact if any variation in the detected battery voltages exceeds a specific threshold value.

19. The method according to claim 18, wherein contacts of the reference subscriber are designed to be redundant.

20. The method according to claim 19, wherein in a motor vehicle, the comparison of the battery voltage is carried out only above a specific rotation speed value.

21. The method according to claim 18, wherein in a motor vehicle, the comparison of the battery voltage is carried out only above a specific rotation speed value.

22. An apparatus for testing ground contact of members in a networked system in which data are sent and received among said members via two lines, wherein:

one line at each member is connected via a first resistance to a common potential for the members and is connectable via a controllable switch to a further potential;

the other line at each member is connected via a second resistance to a member-specific potential and is connectable via a controllable switch to a common potential;

a voltage across at least one of said first and second resistances is supplied to one input of a comparator whose other input is supplied with a comparison potential; and the state of the ground contact of member is deduced based on an output signal from the comparator.

23. The apparatus according to claim 22, wherein the potentials which are supplied to the inputs of the comparators are generated from one voltage and are supplied to the respective inputs of the comparators via a multiplexer.

24. The apparatus according to claim 22, wherein the voltages to be measured are supplied via a multiplexer to an evaluation unit.

* * * * *